United States Patent [19]

Spat

[11] Patent Number: 4,784,553
[45] Date of Patent: Nov. 15, 1988

[54] VIBRATION RESISTANT FASTENER CONSTRUCTION

[75] Inventor: Melvin Spat, Stamford, Conn.

[73] Assignee: Casco Products Corporation, Bridgeport, Conn.

[21] Appl. No.: 919,770

[22] Filed: Oct. 16, 1986

[51] Int. Cl.$^4$ .................. F16B 39/284; F16B 37/16
[52] U.S. Cl. .................. 411/247; 411/437; 411/941
[58] Field of Search ............... 411/194, 174, 202, 203, 411/290, 291, 288, 294, 299, 300, 523–529, 222, 311, 437, 247, 941

[56] References Cited

U.S. PATENT DOCUMENTS

| | | | |
|---|---|---|---|
| 1,421,127 | 6/1922 | Chism | 411/247 |
| 1,422,750 | 7/1922 | Davis | 411/941 |
| 2,197,220 | 4/1940 | Kost | 411/528 |
| 2,236,929 | 4/1941 | Tinnerman | 411/527 |
| 2,351,065 | 6/1944 | Poupitch | 411/941 |
| 3,870,857 | 3/1975 | Horwitt et al. | |
| 3,892,944 | 7/1975 | Horwitt et al. | |
| 3,904,848 | 9/1975 | Horwitt et al. | |
| 3,925,655 | 12/1975 | Mattis | |
| 4,168,422 | 9/1979 | Horwitt et al. | |
| 4,177,374 | 12/1979 | Horwitt et al. | |
| 4,204,108 | 5/1980 | Horwitt et al. | |
| 4,204,109 | 5/1980 | Horwitt et al. | |
| 4,207,455 | 6/1980 | Horwitt et al. | |
| 4,230,931 | 10/1980 | Horwitt et al. | |
| 4,508,477 | 4/1985 | Oehlke et al. | 411/174 |

FOREIGN PATENT DOCUMENTS

| | | | |
|---|---|---|---|
| 642952 | 3/1937 | Fed. Rep. of Germany | 411/437 |
| 568334 | 3/1945 | United Kingdom | 411/222 |

Primary Examiner—Neill Wilson
Attorney, Agent, or Firm—Mitchell D. Bittman

[57] ABSTRACT

A vibration-resistant attachment device involving a threaded stud having thread crests, and a sheet metal member having an aperture the edge of which constitute an element of an interrupted female screw thread through which element the threaded stud extends. The sheet metal member has a resilient tab which is struck from it, and the tab has an anti-backoff structure providing a sharp cutting edge which engages at least one thread crest, and enables by-passing movement of the crest when the stud is turned in a screwing-on direction with respect to the sheet metal member, and which bites into the crest so as to resist subsequent movement of the stud in an unscrewing direction. The construction is especially adapted for securement of a knob to a cigar lighter ignitor plug.

10 Claims, 1 Drawing Sheet

U.S. Patent  Nov. 15, 1988  4,784,553
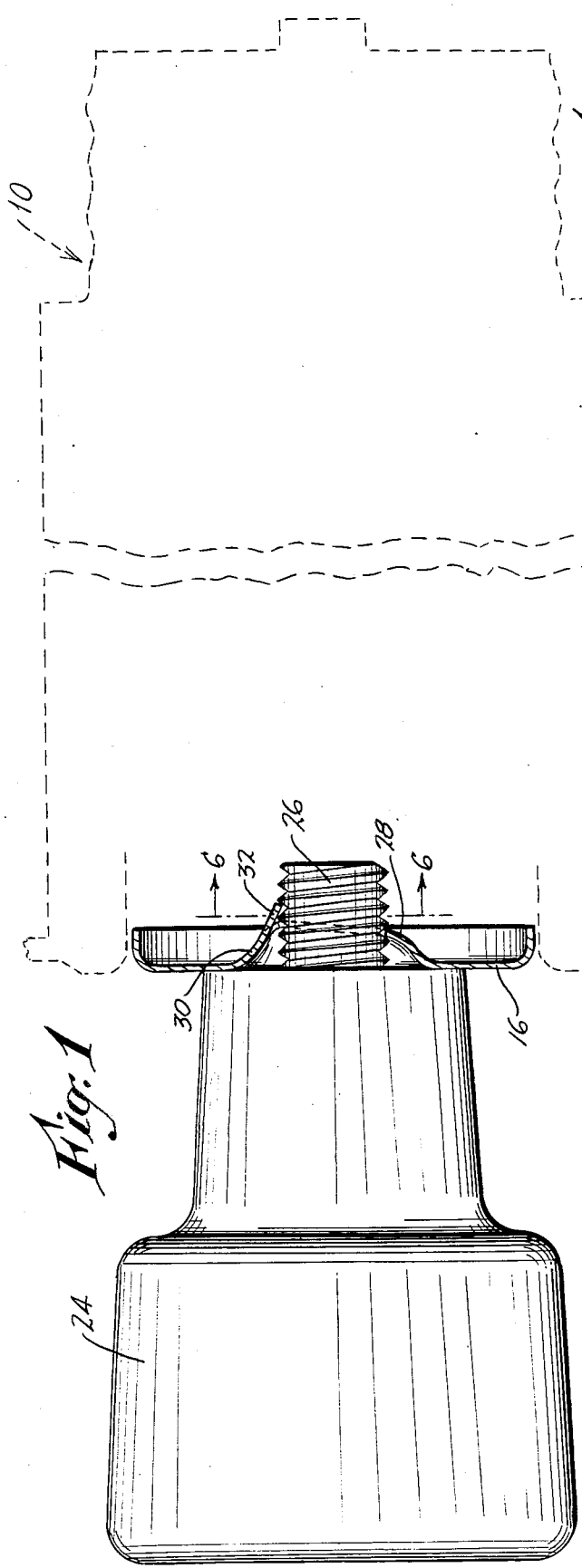
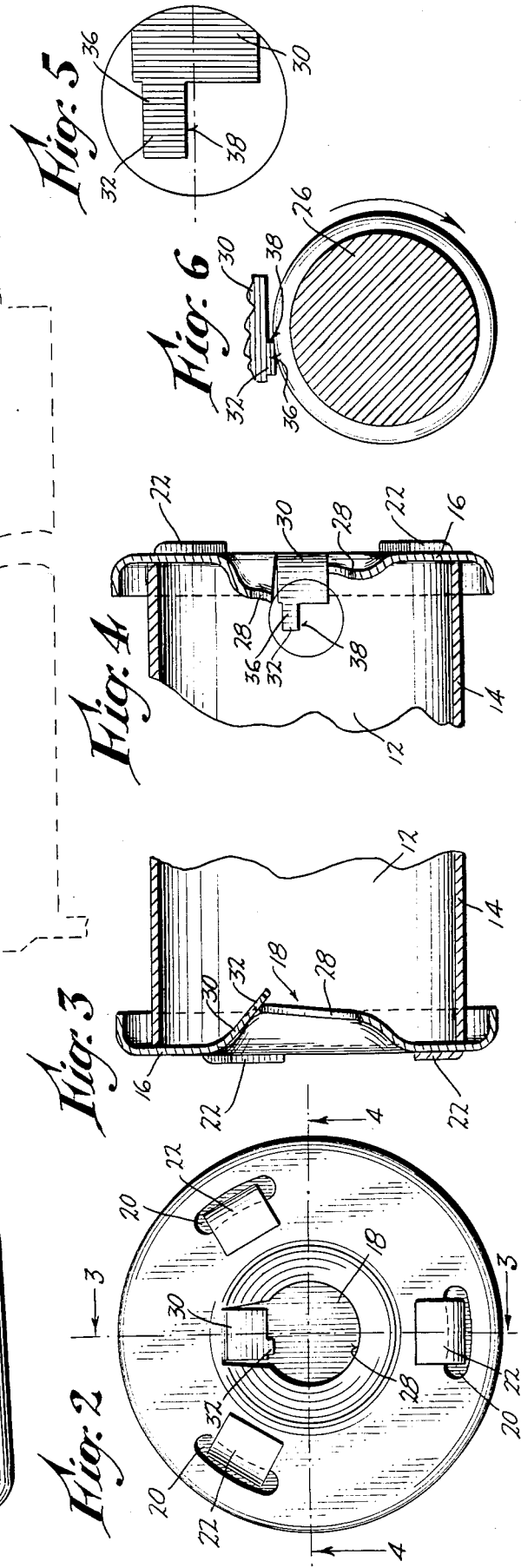

VIBRATION RESISTANT FASTENER CONSTRUCTION

STATEMENT AS TO RIGHTS TO INVENTIONS MADE UNDER FEDERALLY SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to vibration-resistant fasteners, and more particularly to devices having cooperable thread formations especially adapted to resist inadvertent loosening from vibration once they have been assembled to one another.

2. Description of the Related Art Including Information Disclosed Under 37 CFR §§1.97-1.99

The present invention has special utility as applied to the retention of a knob having a threaded stud to an ignitor plug body of an automotive-type electric cigar lighter.

A typical lighter is illustrated and described in U.S. Pat. No. 3,870,857 issued Mar. 11, 1975 to L. G. Horwitt and D. J. Mattis, and entitled CIGAR LIGHTER IGNITING UNIT. The ignitor plug comprises a tubular body in the form of a spacer member 46 and a transverse apertured end cap 48. The edges of the aperture form a partial thread which receives a stud secured to the lighter knob, by which the ignitor plug body can be grasped and held in the hand of the user. A pressure tooth 58 extends into the path of the stud, and the threads thereof experience a frictional force applied by the tooth, in order to improve the retention of the knob on the plug body.

The disclosed arrangement has been successfully employed over a period of many years and in thousands of cigar lighter units. It has been determined, however, that under certain circumstances there exists a tendency for the knob (and stud) to loosen from the plug body. This occurrence is undoubtedly a result of vibration associated with handling of the device during its final assembly, shipping, and subsequent installation in the dashboard of a vehicle.

Efforts to solve the problem by increasing the stiffness of the pressure tooth have been impractical, since the cap and tooth are constituted as a stamping from a relatively thin piece of sheet metal which would also have to be thickened if this approach were to be adopted. Similarly, the amount of torque than can be safely applied to the knob during assembly is limited, since care must be exercised to insure that the single turn thread formed by the edges of the aperture do not become "stripped" or otherwise deformed, by over-tightening.

SUMMARY OF THE INVENTION

The above disadvantages and drawbacks of prior threaded fastener constructions are obviated by the present invention which has for one object the provision of a novel and improved fastener construction which is extremely simple in construction and inexpensive to manufacture and produce.

A related object of the invention is to provide an improved fastener construction as above set forth, wherein substantially increased resistance to loosening is realizable, without the need for additional locking components such as lockwashers, locknuts, etc.

Still another object of the invention is to provide an improved fastener construction of the kind indicated, wherein at least one of the components can be fabricated as a simple metal stamping, and wherein only minimal finishing operations are required following fabrication.

Yet another object of the invention is to provide an improved fastener construction as above characterized and adapted for use with automotive cigar lighters, wherein one component thereof, namely the metal stamping constituting the end cap, can be incorporated in most modern cigar lighter designs without requiring either re-tooling, or alterations in the existing structure of such lighters.

The above objects are accomplished by a vibration-resistant attachment device involving a threaded stud having thread crests, and a sheet metal member having an aperture the edges of which constitute an element of an interrupted female screw thread through which element the threaded stud extends. The sheet metal member has a resilient tab which is struck from it, and the tab has a unique anti-backoff structure providing a sharp cutting edge which engages at least one thread crest, and enables ongoing movement of the crest when the stud is turned in a screwing-on direction with respect to the sheet metal member, but which bites into the crest so as to resist subsequent movement of the stud in an unscrewing direction. The construction is especially adapted for securement of a knob to a cigar lighter ignitor plug.

Other features and advantages will hereinafter appear.

BRIEF DESCRIPTION OF THE DRAWINGS

FIG. 1 is a view, partly in side elevation and partly in axial section, of the improved fastener construction of the present invention, particularly showing a knob carrying a threaded stud, and an apertured end cap constituted as a component of a cigar lighter ignitor plug shown in fragmentary section in FIG. 3. The knob is assembled to the end cap and intended to be grasped and manipulated by the user. In dotted outline there is illustrated a socket for the ignitor plug.

FIG. 2 is a left end elevation of the cap and ignitor plug of FIGS. 1 and 3, particularly showing a central aperture and three circumferential slots through which retainer fingers from the ignitor plug extend and which are bent radially inward, to hold captive the end cap on the remainder of the plug.

FIG. 3 is a section taken on the line 3—3 of FIG. 2.

FIG. 4 is a section taken on the line 4—4 of FIG. 2.

FIG. 5 is fragmentary view of that portion of a pressure tooth or tab of the end cap which lies within the circle of FIG. 4, and FIG. 6 is a transverse section taken through the stud and illustrating in elevation the pressure tooth or tab of the cap, having an anti-backoff extension thereon. The sectional view is substantially on the line 6—6 of FIG. 1.

DESCRIPTION OF THE PREFERRED EMBODIMENT

Referring to FIG. 1 there is illustrated in dotted outline a cigar lighter socket generally designated by the numeral 10, of a type similar to that illustrated and described in U.S. Pat. No. 3,870,857 identified above. Associated with the socket is a removable ignitor plug that comprises heating element structures and electrical/mechanical components associated therewith (not shown). The body of the plug is designated 12, having a tubular wall portion 14. An end cap 16 illustrated in FIGS. 1-4 extends transversely of the remainder of the body 12, in the usual manner.

The end cap 16 has a central aperture 18, and has three arcuate, circumferentially-spaced slots 20 through which three fingers 22 that are integral with the tubular part 14 of the body extend. The fingers 22 are bent over in a radially inward direction, so as to retain the end cap 16. In FIG. 1 there is illustrated a knob 24 that is carried on a threaded stud 26, the knob 24 and stud 26 being assembled to and held on the end cap 16. The ignitor plug 12 can thus be grasped and held by its knob in the conventional manner.

The edges of the central aperture 18 of the end cap 16 form an interrupted female thread element 28 having the configuration of a portion of a helix, extending through somewhat less than a complete turn. In FIG. 2, the helix extends through about ¾ of a turn, in a preferred form. The female thread element 28 is thus seen to be interrupted.

In accordance with the present invention there is provided a novel and improved retention structure in combination with the threaded stud 26 and female thread element 28, comprising a radially inwardly extending pressure tooth or tab 30, which is elongate and has a main wide portion and a narrow extension 32. The main portion has a width somewhat less than the diameter of the stud 26, as seen in FIG. 6.

By the present invention, the extension 32 of the tab 30 is formed in a unique configuration, having a reduced width and being offset from the centerline of the tab 30; the extension 32 has a sharp biting edge or corner constituted of two intersecting faces 36 and 38, the face 36 being substantially tangent to the stud 26 and the other face 38 extending substantially parallel to the stud 26. The intersection of the two faces 36, 38 constitutes a sharp biting corner or edge, as seen in FIG. 6. The intersection of the edges 36 and 38 is so disposed that it enables on-going movement of the thread crests to occur when the stud 26 is being turned in a screwing-on direction as indicated by the arrow in FIG. 6, and to cut into a crest of the stud thread and prevent unscrewing movement thereof when the latter is turned in an unscrewing direction in this figure. In effect, the corner formed by the faces 36, 38 constitutes an anti-backoff structure acting on the stud 26, to prevent inadvertent loosening or unscrewing movement thereof.

As a consequence, when the knob 24 and stud 26 are initially assembled to the cap 16, the threads of the stud 26 engage the edge of the aperture 18, containing the partial female thread element 28, and as the knob 24 is screwed in by one or two turns, the tooth extension 32 engages the thread crests as in FIGS. 1 and 6. Since the sharp corner formed by the faces 36, 38 of the extension 32 acts in a manner to enable the thread crests to slide by it with on-going movement, little or no resistance to such turning is encountered and the stud can be readily tightened to a predetermined, desired torque. Following tightening, any tendency for the knob and stud to back-off or unscrew is prevented by a biting engagement of the edge of the extension 32 with the crests of the thread as in FIG. 6. Inadvertent loosening of the knob 24 as a result of handling, shipping or other factors is thus effectively prevented.

In FIG. 6 the extension is shown as being adjacent to but wholly to one side of the longitudinal centerline of the tab 30. The biting edge is similarly offset slightly to one side of this centerline. The dimensions illustrated have been determined to provide excellent retention, with little or no tendency for loosening of the knob and stud following initial assembly.

Note that in the showing of FIG. 6, the extension 32 makes a large angle of almost 90° with respect to the paper, or almost 180° (parallel) with respect to the axis of the stud 26.

The disclosed construction has the important advantage that it is compatible with many modern lighter designs, involving merely a substitution of a new end cap 16 for that of an existing unit. That is, the knob 24 and stud 26 of existing units need not be altered or replaced.

Fabrication of the cap involves essentially no increase in cost as compared to prior end caps of conventional design. In addition, the assembly procedures are comparable, and as a result no special equipment is required. Manufacturing costs are thus contained, and kept at an absolute minimum.

The disclosed device is thus seen to represent a distinct advance and improvement in the field of vibration-resistant fastener devices.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A vibration-resistant attachment device, comprising in combination:
   (a) a threaded stud having thread crests,
   (b) a sheet metal member having an aperture the edges of which constitute an element of an interrupted female screw thread through which element the threaded stud extends,
   (c) said sheet metal member having an integral thread-crest engaging means comprising an elongate, resilient tab which is struck from the sheet metal member, said tab having anti-backoff means comprising a face providing a sharp cutting edge extending longitudinally of the tab, said cutting edge engaging at least one crest of the threaded stud, and said anti-backoff means enabling by-passing movement of the said one crest when the stud is turned in a screwing-on direction with respect to the sheet metal member, said longitudinal cutting edge of the anti-backoff means biting into the said one crest so as to resist subsequent movement of the stud in an unscrewing direction.

2. The invention as set forth in claim 1, wherein:
   (a) said anti-backoff means comprises an additional face, said additional face intersecting the first face, said intersecting faces providing said cutting edge.

3. The invention as set forth in claim 2, wherein:
   (a) one of said faces extends substantially tangentially to the stud and in a direction opposite to the screwing-in direction of turning of the stud in the sheet metal member, whereby said screwing-in turning of the stud is less impeded by the cutting edge than the unscrewing thereof.

4. The invention as set forth in claim 1, wherein:
(a) said edge is located adjacent the longitudinal centerline of the tab.

5. The invention as set forth in claim 4, wherein:
(a) said edge is located to one side of the longitudinal centerline of the tab.

6. The invention as set forth in claim 1, wherein:
(a) said sheet metal member and tab are constituted of spring steel.

7. A vibration-resistant attachment device, comprising in combination:
(a) a threaded stud having thread crests,
(b) a sheet metal member having an aperture the edges of which constitute an element of an interrupted female screw thread through which element the threaded stud extends,
(c) said sheet metal member having thread-crest engaging means comprising a resilient tab which is struck from the sheet metal member, said tab having anti-backoff means comprising a face providing a sharp cutting edge which engages at least one crest of the threaded stud, and said anti-backoff means enabling by-passing movement of the said one crest when the stud is turned in a screwing-on direction with respect to the sheet metal member, said anti-backoff means biting into the said one crest so as to resist subsequent movement of the stud in an unscrewing direction, (d) said anti-backoff means comprising an additional face, said additional face intersecting the first face, said intersecting faces providing said cutting edge,
(e) said faces comprising portions of a rectangular extension of said tab.

8. The invention as set forth in claim 7, wherein:
(a) said faces are substantially perpendicular to one another.

9. The invention as set forth in claim 7, wherein:
(a) said extension is disposed wholly at one side of the longitudinal centerline of the tab.

10. A vibration-resistant attachment device, comprising in combination:
(a) a threaded stud having thread crests,
(b) a sheet metal member having an aperture the edges of which constitute an element of an interrupted female screw thread through which element the threaded stud extends,
(c) said sheet metal member having thread-crest engaging means comprising a resilient tab which is struck from the sheet metal member, said tab having anti-backoff means comprising a face providing a sharp cutting edge which engages at least one crest of the threaded stud, and said anti-backoff means enabling by-passing movement of the said one crest when the stud is turned in a screwing-on direction with respect to the sheet metal member, said anti-backoff means biting into the said one crest so as to resist subsequent movement of the stud in an unscrewing direction,
(d) said tab having an end portion which is received in the groove which is immediately adjacent to said one crest of the threaded stud.

* * * * *